United States Patent [19]

Lodetti et al.

[11] Patent Number: 4,574,464
[45] Date of Patent: Mar. 11, 1986

[54] AUTOMATIC TOOL CHANGING MECHANISM FOR MACHINE TOOLS

[75] Inventors: Attilio Lodetti; Hansueli Blaser; Brenno Medici, all of Losone; Arno Sieg, Locarno, all of Switzerland

[73] Assignee: AG fur Industrielle Elektronik AGIE, Losone, Switzerland

[21] Appl. No.: 534,047

[22] Filed: Sep. 20, 1983

[30] Foreign Application Priority Data

Sep. 22, 1982 [CH] Switzerland .................. 5606/82

[51] Int. Cl.[4] .......................................... B23Q 3/155
[52] U.S. Cl. ....................................... 29/568; 408/35
[58] Field of Search ............... 29/568, 26 A; 408/35; 279/1 TS; 211/1.5

[56] References Cited

U.S. PATENT DOCUMENTS

| 3,074,147 | 1/1963 | Miller et al. | 408/35 |
| 3,271,853 | 9/1966 | Pfister | 29/568 |
| 3,413,702 | 12/1968 | Burg | 408/35 |
| 3,635,569 | 1/1972 | Sato et al. | 29/568 |
| 4,196,501 | 4/1980 | Shimajiri et al. | 29/568 |

FOREIGN PATENT DOCUMENTS

| 18273 | 3/1968 | Japan | 29/568 |
| 45349 | 4/1981 | Japan | 29/568 |
| 163856 | 12/1981 | Japan | 29/568 |
| 274970 | 8/1976 | U.S.S.R. | 29/568 |

Primary Examiner—Weidenfeld Gil
Assistant Examiner—Daniel W. Howell
Attorney, Agent, or Firm—Neuman, Williams, Anderson & Olson

[57] ABSTRACT

The tool changing mechanism is provided with means for the direct transfer of tools through the working sleeve or spindle. The transfer means preferably have rapid clamping means, which are controlled by the working movement of the spindle or sleeve, so that there is no need for a separate transfer station for the tools from the magazine to the spindle or sleeve, so that much space is saved. The magazine is preferably essentially arranged around the assembly for receiving and guiding the working spindle or sleeve. Preferably, the magazine is substantially located over the projected base surface of the machine working table.

6 Claims, 9 Drawing Figures

AUTOMATIC TOOL CHANGING MECHANISM FOR MACHINE TOOLS

The invention relates to an automatic tool changing mechanism for machine tools, particularly spark erosion machines. Such mechanisms are used for storing a desired number of tools for automatically performing predetermined machining operations.

Automatic tool changers have been used in connection with machine tools for some time following the introduction of numerical controls making it possible to automatically control complete machining and movement cycles. A typical example is described in U.S. Pat. No. 3,704,510. The mechanism disclosed in such patent includes a tool magazine, transfer devices and an associated electrical means. The use of a tool magazine having vertically or horizontally positioned disks with dividing mechanisms ("turrets") or chain and belt magazines or shelf magazines is also known in the prior art. There is known in the prior art a specific transfer location for transferring the tools between the magazine and the transfer mechanism. For this purpose, there is an independent magazine drive, which may be electrical, hydraulic or pneumatic which may also employ shafts, gears or chains. Such tool changers are known for use in the abrading machining of workpieces, particularly in spark erosive machining.

According to "Industrie-Anzeiger," 101, 1979, No. 55, pp. 41–42, a horizontally arranged disk magazine is known in this connection and is placed around the column of an eroding machine tool. DOS No. 3,006,650 discloses another construction of a spark eroding machine, which is arranged laterally on the column. Whereas, according to "Industrie-Anzeiger" a hydraulic transfer mechanism in the form of a slide is provided for transferring the electrodes in he vicinity of the sleeve or spindle which performs a translatory movement, according to DOS No. 3,006,650 a displacement device arranged laterally on the column is used for transfer purposes and performs an additional pivoting movement. Another standard variant of such tool changers for spark erosion machines has a slide with a holding plate for electrode receptacles, as well as a rail system with spindle drive on which the slide can be pivoted from a vertical neutral position into the horizontal working position to the sleeve and back again.

The disadvantages of these known automatic tool changing mechanisms comprise firstly the high manufacturing costs and effort required for the transfer means. Such known mechanisms also require a relatively large amount of space on the spindle or sleeve for the pivoting movement into the working area. Since in the case of abrading machining, particularly spark erosion machining, working takes place in the presence of liquids and particularly dielectric working media having solvent properties, additional expense is incurred in collecting the liquid carried over from the working zone during the tool change, and in preventing such liquid contact with the generally lubricated bearing, drive and transfer means, as well as dripping onto the workshop floor. In certain circumstances, very long idle times are linked with the changing and return of the tool from the spindle or sleeve to the magazine and the loading of a new tool. These times can be reduced when working with a transfer mechanism having a double gripper, so that it is possible to prepare the following tool during the work being performed with the preceding tool. However, even then the transfer means require times representing a considerable interruption to the sequence of operations.

Two simplified versions are known for the purpose of reducing the large expenditures linked with the aforementioned tool changing system. In the first of these simplified solutions, the complete electrode magazine is directly mounted on the sleeve or spindle. For example, as the disk magazine according to U.S. Pat. No. 3,363,083, FIGS. 11 and 12, it is always turned in the machining position, no automatic drive means being provided. A further disadvantage of this first simplified version is that due to the limited space, normally available on the sleeve, only very few electrodes can be stored. In addition, the electrode magazine connected to the working sleeve or spindle requires additional movement space for the working operation. Furthermore, in spark erosion machining, the sleeve must generally perform very rapid movements, wherein the additional weight of the electrode magazine is detrimental.

In the second simplified solution, the tool electrodes are not fixed to the spindle or sleeve and are instead located in the working area of the machine table, which carries the particular workpiece to be machined. Thus, the electrodes stored there are located within the movement paths of the table, or must be brought into the table adjustment range during the loading process by an additional translatory or rotary sliding movement. However, this reduces the working space of the particular machine tool by the area in which the tool electrodes are stored prior to use. Changing the electrodes then additionally requires the displacement of the table with its driven spindles under the momentary position of the spindle or sleeve, so that a collision-free space must be left for this displacement movement of the clamping means for the workpiece to be machined. Apart from the fact that this leads to a further organizational difficulty in that the planning of the machine tooling operations must take account of the tool change, the generally slow table movements also lead to a relative large down time when an electrode has to be changed. As the electrodes stored on the machine table necessarily are set down in the marginal zones of the adjustment range for the table, a very large adjustment path must be performed for changing the electrodes, so that as a rule the precision of machining is unfavorably affected, because during the moving away and subsequently moving in over a very large distance movement imprecisions are unavoidable.

SUMMARY OF THE INVENTION

The object of this invention is to provide a simple tool changing mechanism, mainly by the elimination of complicated tool transferring means. In addition, the disadvantages of the two aforementioned simplified versions of the prior art are avoided, in that the tool change takes place without any significant action with respect to the space concept and the movement concept of the machine. This problem is solved by the features recited in the claims.

The advantage of the provided mechanism of this invention is that it can be provided with reduced costs and effort, but nevertheless leads to decisive and surprising advantages, which could otherwise only be achieved with much greater expenditures. There is no longer any need for separate transfer mechanisms for transferring the particular tool required to the spindle or sleeve performing the operation. Advantageously, the space around the machining point for the workpiece is kept free from additional units, so that it can be readily visually scrutinized and is readily accessible, particularly for setting up the workpiece. It also helps to increase safety for operating personnel, because there are no projecting or overhanging parts. Finally, the mechanism can be arranged over the projected base surface of the machine work table, so that carried over cooling or working liquids drop back into the working area of the machine, without undesired and dangerous liquid accumulations on the floor.

The integration of the tool changer into the general control program of the machine can take place without any restrictions, so that no difficulties are caused by the incorporation into a machining sequence (e.g., into the automatic performance of roughing and finishing processes in a program). The apparatus can also be used in conjunction with stacking magazines, for changing electrodes only, as well as for working with tool electrodes in tool electrode holders in which the electrodes are preset for machining, or which are mounted on corresponding support plates to give complete tool electrode sets.

BRIEF DESCRIPTION OF THE DRAWINGS

The invention is described in greater detail hereinafter relative to the illustrated representative embodiments of the attached drawings, wherein are shown in.

DETAILED DESCRIPTION OF THE INVENTION

Figure 1:
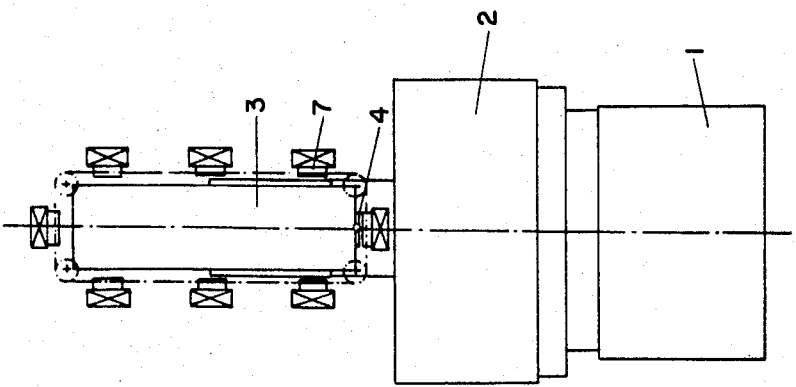
FIG. 1 the arrangement of the described tool changing mechanism on a machine tool, specifically a spark erosion countersinking machine in front view.

The machine tool shown in FIG. 1 comprises a frame 1, on which is arranged a tool-carrying coordinate table 2 with working containers and motor drives in a per se known construction. The frame 1 comprises upper and lower arms 82 and 81 respectively interconnected by vertical arm 84. It will be noted that table 2 is disposed on frame arm 81. An assembly 3 is secured to a front-facing surface 87 of upper frame arm 82 in the manner seen more clearly in FIGS. 3b and 4b of the drawing. carries the sleeve or spindle which, in the present case, performs the actual working movement for a spark erosion countersinking machine. For this purpose, the tool electrodes corresponding to the automatic machining sequence must be mounted on a sleeve nose 4. This is effected by a tool changing mechanism 5, which is preferably constructed as a chain or belt magazine, which has a drive 6 and which carries a plurality of transfer holders 7, which are chosen in accordance with the practical needs regarding the number of tools to be stored and bearing in mind the space limitations dictated by the size of the machine tool.

Figure 3A:
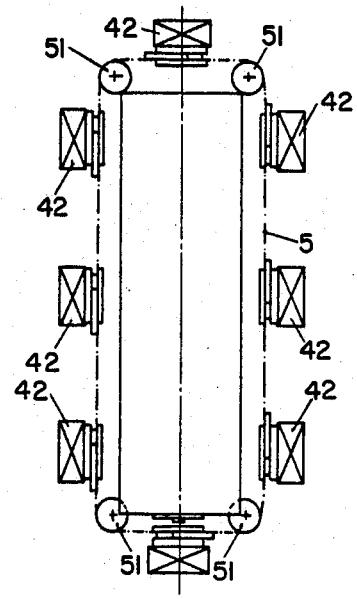
FIG. 3a is a front elevational view of tool changing elements employed in the provided apparatus of this invention illustrated in a tool changing movement.
Figure 3B:
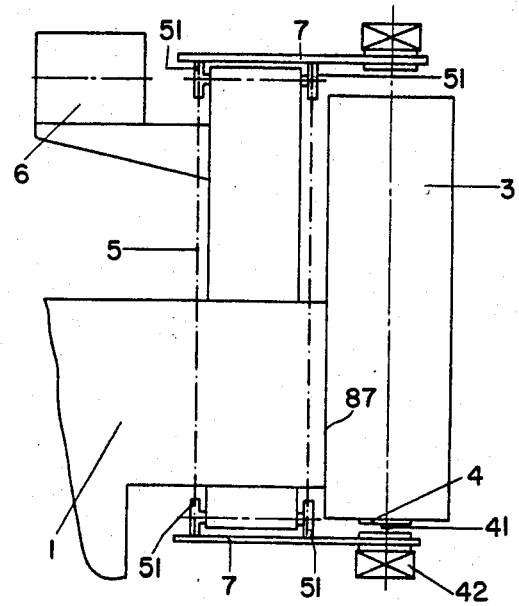
FIG. 3b is a side elevational view of the tool changing elements of FIG. 3a, illustrating a supporting frame member fragmentarily.
Figure 4A:
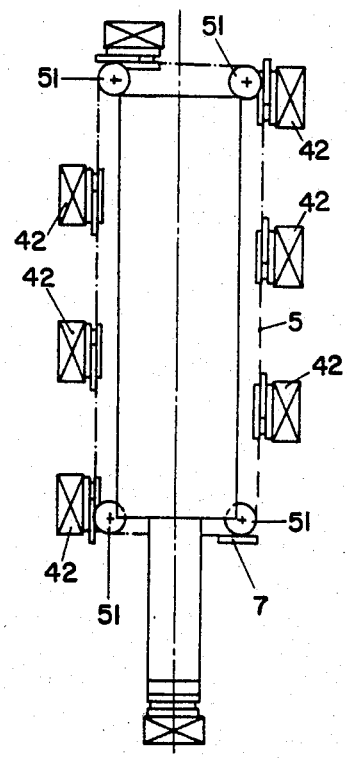
FIG. 4a is a front elevational view similar to FIG. 3a illustrating the tool changing apparatus following transfer of a tool member into a working position.
Figure 4B:
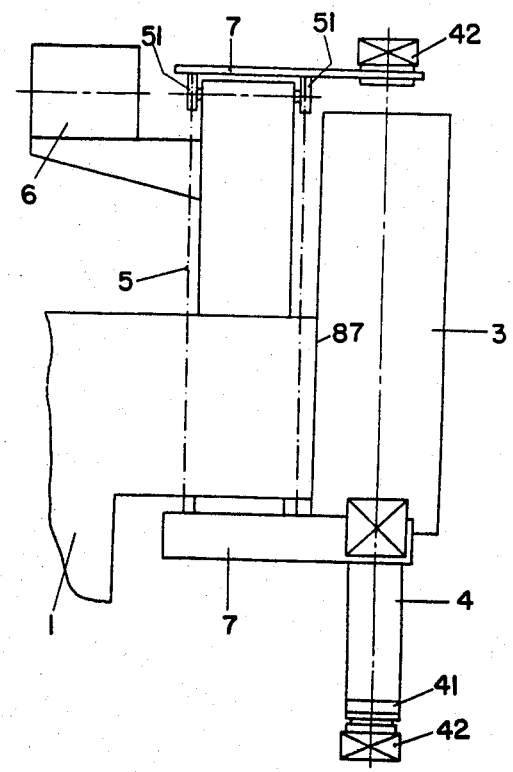
FIG. 4b is a side elevational view similar to FIG. 3b illustrating the tool changing apparatus of this invention after a tool has been transferred to a tool holder.

FIGS. 3a, 3b, 4a and 4b show detail of structural features of the tool changer 5. FIGS. 3a and 3b show in front and side view the tool changing mechanism with, as illustrated by way of Example, a total of eight magazine positions, in a position in which the tool electrode is changed. In FIGS. 4a and 4b the same views are shown in the neutral position for the tool changer which is assumed during the period when machining work is performed by the spindle or sleeve. The workpiece, positioning table and remaining structural parts of the machine tool comprising no part of this invention are omitted in FIGS. 3a, 3b, 4a and 4b.

According to FIG. 3b, on the sleeve nose 4 is provided an automatically controllable clamping part 41, in which is automatically fixed a tool electrode provided by the tool changing mechanism, or a tool electrode fixed in the holder or a tool set electrode 42. Such clamping accessories are generally known and are already available in automated form. It is possible to use both conical and cylindrical mandrels, as well as double prismatic clamping devices for tool-engaging purposes. In conjunction with the clamping process, it is simultaneously ensured that the connections for possible pressure and suction scavenging of the working zone and, in the case of spark erosion machining, that the connection of the electrode cables takes place automatically, e.g., with the aid of a flange with multiple connections. Such known means are not shown in the drawing for purposes of clarity with respect to the description of the mechanism of this invention.

The various electrodes 42 or holders with electrodes required in a working cycle, are stored in a corresponding number of transfer holders 7, which themselves form part of the tool changing mechanism 5. In a preferred construction, chain or belt drives are used, which are arranged around or in the immediate vicinity of assembly 3 having sleeve nose 4, in such a way that with the aid of drive 6 (FIG. 2), each transfer holder called up by the machine control program can be moved into position in front of the clamping mechanism 41 on the sleeve nose 4. The conveying means can be in particular constituted of belt or chain means, which can move around the assembly 3 without great expenditure of force by means of guide pulleys 51 (FIGS. 3a and 3b).

Figure 2:
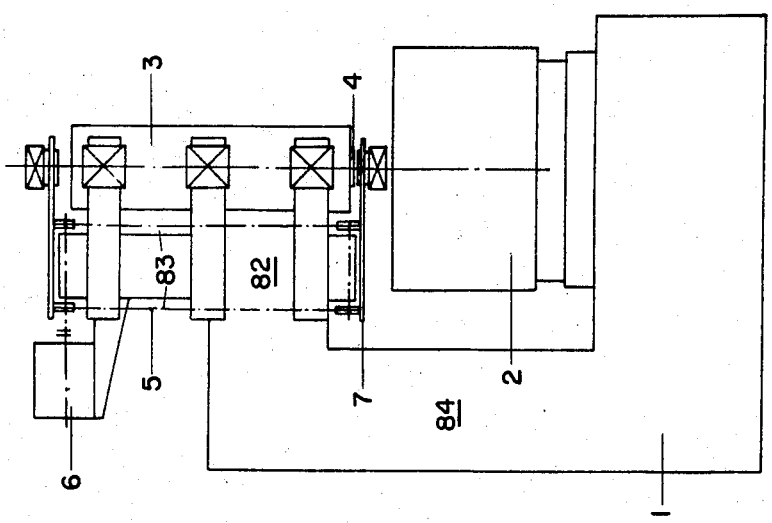
FIG. 2 a side view of the mechanism according to FIG. 1.
Figure 5:
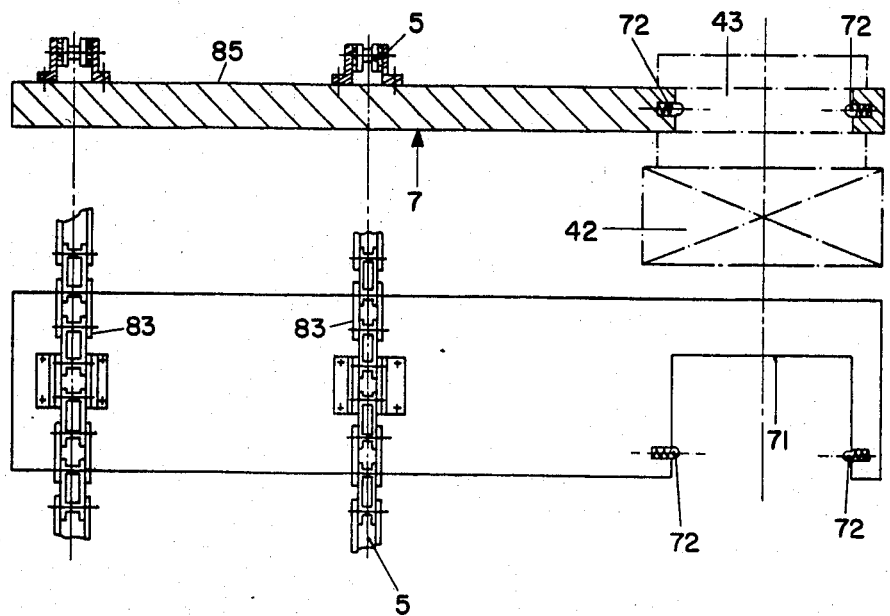
FIG. 5 a first embodiment of a transfer holder of the tool changer to the spindle or sleeve.
Figure 6:
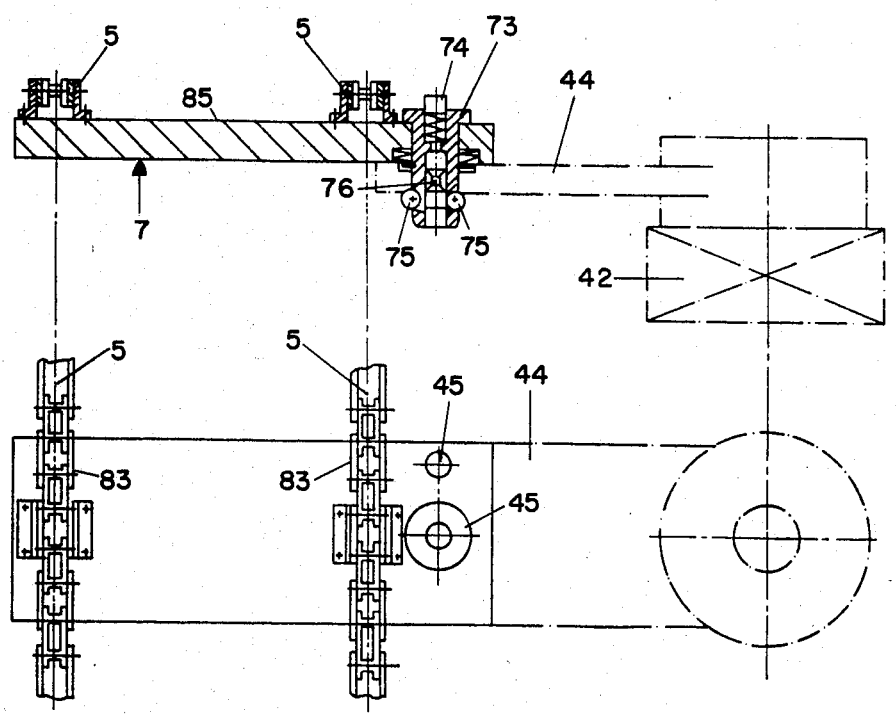
FIG. 6 a second embodiment for a transfer holder of the tool changer to the sleeve or spindle.

The transfer holders are, for example, directly fixed to chains, such as chains 83 of FIGS. 2, 5 and 6. To enable the tool electrode to be transferred, or a tool electrode 42 fixed in a holder to be brought with sufficient precision and clearly defined orientation for clamping on the sleeve clamping mechanism in the transfer station area, the chain or belt conveying means may be provided with transverse guidance means, e.g., guide rails. By appropriate selection of the size of the chain or belt loop and by the choice of the spacing for the transfer holders 7, it is possible to house any random number of electrodes or holders 42 in the magazine.

In contrast with FIGS. 3a and 3b, in FIGS. 4a and 4b the stored electrodes are shown moved out of the transfer position by a half spacing, so that the transfer holder 7 (FIG. 4a) last positioned at the transfer point, following the fixing of the electrode is now without an electrode, and electrode holder 42 is positioned laterally alongside the sleeve. The clamping of the electrode or electrode holder on clamping part 41 of sleeve nose 4 takes place as a result of a short-stroke feed movement and automatic release of the clamping means. This feed movement is made clear in FIG. 3b by the distance between clamping means 41 and electrode holder 42. Following the lateral movement of the transfer holder, according to FIGS. 4a and 4b it is now possible to perform the working movement with the tool electrode 42 fixed to the sleeve nose 4, which is made apparent by the extended position of the sleeve.

FIG. 5 shows in greater detail a first embodiment of the transfer holder. The electrode 42 fixed to the holding means is received in a forked opening 71 of transfer holder 7 by means of an e.g., groove-like recess 42 on its circumference and is locked with locking means e.g., spring-loaded cam 72. Holder 7 of FIG. 5 comprises an integral arm 86 having opening 71 formed in the distal end thereof. As a result of the movement of the transfer holder with the aid of the tool changer 5, following the securing of electrode 42 by the clamping means on sleeve nose 4, the transfer holder can be disengaged and then re-engaged at the end of the work. Dust caps can be fitted to the transfer holder to keep the gripping surface clean. Instead of spring loading, cams 72 may be electromagnetically controlled as by a solenoid or the like, the construction of which is very well known in the art.

FIG. 6 shows a second embodiment of a transfer holder 7, where the recess on the electrode holder is replaced by a spacer, e.g., a lever 44. The latter carries additional clamping and centering openings 45 by means of which the complete arrangement can be locked in positionally correct manner on transfer holder 7. For this purpose, the drawing shows a centering mandrel 73 in exemplified manner on which the lever 44 is centered by the movement of the sleeve nose 4 on moving back from the work. By means of a spring loaded pivot 74, positive fixing can be obtained between transfer holder 7 and lever 44 with the aid of cam 75. The latter is spread apart or loosened by an expanding member worked into the pivot 74 in area 76. An advantage of this construction is that after clamping the electrode or electrode holder 42, there is no need for an adjustment movement via tool changer 5 on the clamping part 41 of the sleeve nose 4. Thus, far more storage locations on the magazine can be utilized.

As a modification of the embodiment according to FIG. 6, the detachable clamping means can have a controllable electromagnetically operated clamping or release mechanism, in place of a purely mechanical release control.

Figure 7:
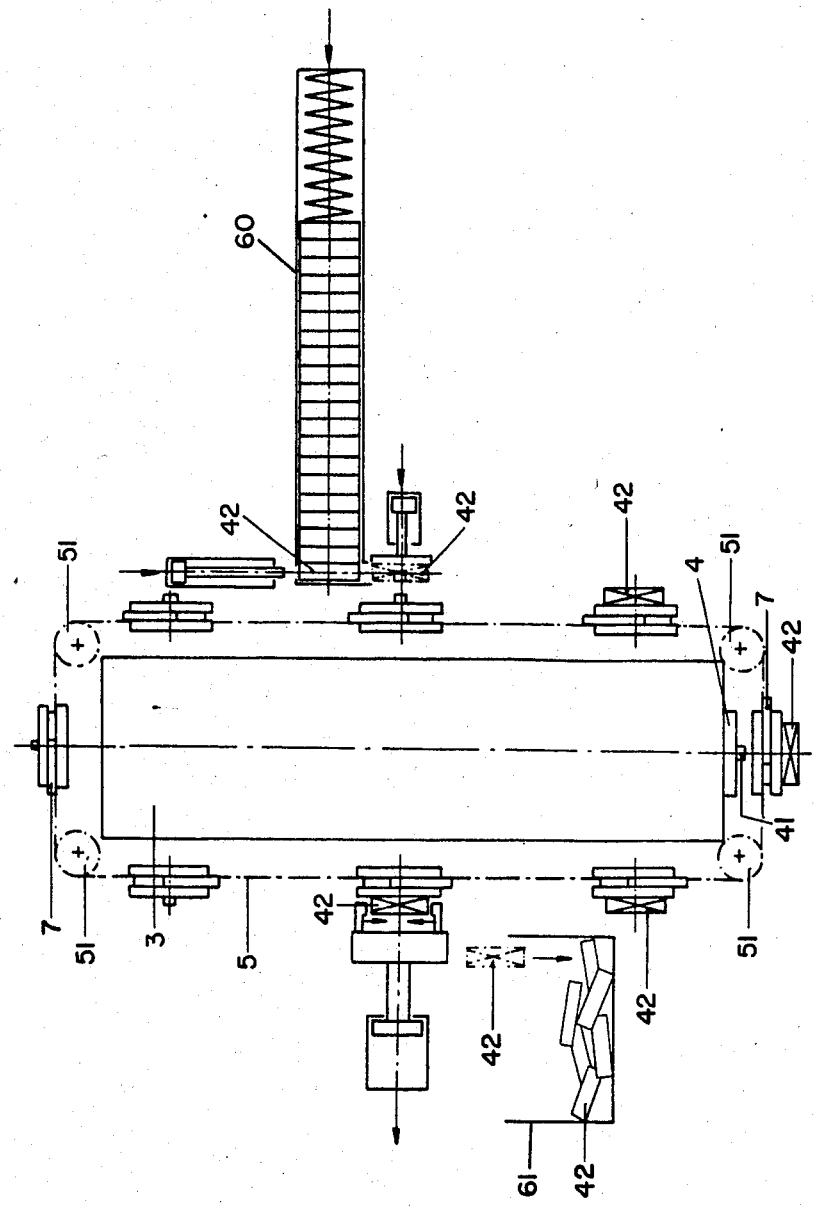
FIG. 7 a further embodiment of a tool changer with tool re-equipping and discharging stations.

FIG. 7 shows another embodiment in which to assist in the rapid loading of consumable or wearable tools into the magazine 5 and for unloading the same following the machining operation, a tool re-equipping station 60 and a tool discharge station 61 are provided. The re-equipping station constantly holds fresh tools of the desired type for introducing into magazine 5. Worn tools from magazine 5 are deposited e.g., into a collecting container in discharge station 61. This feature further increases the storage capacity of magazine 5, which is valuable particularly for machine operating cycles of long duration, without the necessity of an attending workman in the machine vicinity.

Thus, a tool changing mechanism has been provided which efficiently supplies tools as needed to a tool-mounting element of a machine. The provided mechanism effects optimum use of the available space and yet is composed of elements which are readily available and of relatively low cost. It is believed that the foregoing description has made apparent numerous equivalent constructions which will function to equal advantage with the mechanism described. Accordingly, this invention is to be limited only by the scope of the appended claims.

What is claimed is:

1. In a machine such as a spark erosion machine or the like, the combination comprising a C-shaped frame of upper and lower arms interconnected by an intermediate arm; a tool mounting head supportably connected to said upper arm of said C-shaped frame; said frame having a table disposed on the lower arm of said C-shaped frame; said tool mounting head including a tool engaging member which is axially extensible from a retracted position in the tool mounting head toward said table; a tool magazine for releasably carrying a plurality of tools in spaced relation; said tool magazine being supportably mounted on the frame upper arm and including at least one transfer means for carrying and transferring a tool from said magazine to said tool engaging member; said magazine also including a flexible support means supporting said transfer means; the tools on said transfer means being arranged for movement over said table in a plane including the axis of said tool engaging member; said flexible support means encompassing said upper arm of said C-shaped frame in such manner whereby said flexible support means is located between said tool-engaging member and said tool mounting head on one side, and the intermediate arm of said C-shaped frame on the other; each of said tool transfer means comprising a first flat, elongate portion attached to said flexible support means and a second portion for releasably engaging a tool and extending from said first portion a distance adequate to locate a tool carried thereby adjacent said tool engaging member located in said tool mounting head.

2. The machine as defined in claim 1, wherein said transfer means second portion has a first part thereof lying in the same plane as said first portion thereof, one end section of said second portion is provided with a forked opening for receiving a tool therein, and tool locking means are disposed in the side walls of the transfer means portion defining the forked opening.

3. The machine as defined in claim 1, wherein said transfer means second portion is formed as a flat lever lying in a plane parallel to the plane of said first portion thereof, and wherein the distal end of said second portion is provided with a tool and the second portion is detachably connected at its proximal end to said first portion.

4. The machine as defined in claim 3, including means for attaching the proximal end of said second portion of the transfer means to said first portion, comprising spring-loaded pivot means.

5. The machine of claim 1, wherein the tool transfer means second portion includes an electromagnetically operated clamping and release mechanism for releasably engaging a tool carried thereby.

6. The machine as defined in claim 1, wherein a tool re-equipping station and a tool discharge station are provided in combination with the tool transfer means at spaced locations along the path of travel of the tool transfer means, whereby new tools may be engaged by said transfer means and used tools released by said transfer means in the normal course of machine operation.

* * * * *